United States Patent
Kugler

[11] 3,786,337
[45] Jan. 15, 1974

[54] THYRISTORS FOR EFFECTING TAP CHANGING ON TRANSFORMERS AND INCLUDING CURRENT LIMITING RESISTORS AND STANDBY TRIGGER SYSTEM

[75] Inventor: Kurt Kugler, Lappersdorf, Germany

[73] Assignee: Maschinenfabrik Reinhausen Gebruder Scheubeck K.G., Regensburg, Germany

[22] Filed: Feb. 14, 1973

[21] Appl. No.: 332,455

[30] Foreign Application Priority Data
Feb. 17, 1972  Germany.................... P 22 07 367.2

[52] U.S. Cl.............. 323/43.5 S, 317/11 E, 317/16, 307/136
[51] Int. Cl........................... G05f 1/20, H02m 5/12
[58] Field of Search.................. 323/24, 40, 43.5 R, 323/43.5 S; 307/130, 134, 136; 317/11 E, 317/14 B, 16

[56]  References Cited
UNITED STATES PATENTS

| | | | |
|---|---|---|---|
| 3,454,832 | 7/1969 | Hurtle.............................. | 317/16 X |
| 3,558,910 | 1/1971 | Dale et al...................... | 317/11 E X |
| 3,662,253 | 5/1972 | Yamamoto..................... | 323/43.5 S |
| 3,728,611 | 4/1973 | Elvin............................. | 323/43.5 S |

*Primary Examiner*—Gerald Goldberg
*Attorney*—Erwin Salzer

[57]  ABSTRACT

Tap-changing means for tapped transformers include thyristors for effecting tap-changes. Additional tap-changing means include electric fuses, current-limiting resistors and a relay-controlled standby thyristor trigger system prevent the occurrence of dangerous short-circuit currents in case of malfunction of the principal thyristor trigger means.

10 Claims, 3 Drawing Figures

3,786,337

THYRISTORS FOR EFFECTING TAP CHANGING ON TRANSFORMERS AND INCLUDING CURRENT LIMITING RESISTORS AND STANDBY TRIGGER SYSTEM

BACKGROUND OF THE INVENTION

Conventional tap-changing systems of the aforementioned kind include a transformer winding having at least two taps. Either of the two taps can be connected selectively to an outgoing current-carrying line. The connection between the taps and the aforementioned line is normally effected by current-carrying contacts forming part of a transfer switch. The latter includes also disconnect contacts. The current-carrying contacts can be shunted by a pair of thyristor networks which are arranged in series with the aforementioned disconnect contacts. Each thyristor network includes a pair of inverse parallel connected thyristors.

In the stationary state, i.e., when the load current is derived from one of the two taps of a tapped transformer winding and the other tap does not supply any current, one of two pairs of current-carrying contacts of the transfer switch carries the entire load current and no other contact of the transfer switch is current carrying. In that stationary state the constituent thyristors of the two thyristor networks are not triggered and, therefore, non-conductive.

A tap-change involves the following steps in the sequence, or order, stated below:

One of the two pairs of disconnect contacts is closed — if it had not previously been closed — to prepare a current path shunting the pair of engaged current-carrying contacts that is carrying the load current. That current path includes one of the two thyristor networks or the first thyristor network. After triggering of the constituent thyristors of the first thyristor network the load current flows through that thyristor network and the closed disconnect contacts arranged in series with it. Hence the current-carrying contacts by which the load current had heretofore been caused may safely be separated, and are separated. Thereupon the disconnect contacts arranged in series with the other or second thyristor network are closed and the constituent thyristors of said second thyristor network triggered, and no further trigger pulses are applied to constituent thyristors of said first thyristor network. As a result, both thyristor networks will be conductive during a short period of time and the first thyristor network becomes non-conductive following the first zero of the current wave. Now the entire load current is carried by the second thyristor network and by the disconnect contacts that are arranged in series with it. The last step in the process of a tap-change consists in shunting the second thyristor network by closing a pair of current-carrying contacts of the transfer switch, and thereafter deactivating the second thyristor network by interrupting its supply of trigger pulses to it. Now a new stationary state is reached, the entire load current being derived from the tap that had heretofore been inactive, and the tap that had heretofore supplied the entire load current being now inactive.

The required sequence of operations can be achieved with special transfer switches which are well known in the art. The required sequence of operations may also be achieved with any Jansen type transfer switch for tap-changing regulating transformers by resorting to the auxiliary control means disclosed and claimed in U.S. Pat. No. 3,710,232 to M.Matzl, Jan. 9, 1973 for LOGIC-CONTROLLED THYRISTOR SYSTEM FOR PERFORMING TAP-CHANGING OPERATIONS.

What has been described above is a faultless operation of the kind of system under consideration. Such systems may, however, malfunction under certain circumstances.

One of the most dangerous situations results when by malfunctioning of one part or another the thyristors of both thyristor networks are triggers simultaneously. This results in a solid short-circuit of that section of the tapped transformer windings connected to the two simultaneously triggered thyristor networks.

The above situation resulting from malfunctioning of the trigger mans may be remedied by arranging in series with each of the two thyristor networks a current-limiting resistor which is shunted by an electric fuse. In such a system simultaneous triggering of the thyristors in both thyristor networks results in blowing of the shunt fuse across one or across both current-limiting resistors, which then limit the fault current to a relatively low level. This makes it possible to continue operation of the faulted system for some time during which the fault may be detected and repaired and the blown fuse, or fuses, replaced.

The invention relates to a system including the aforementioned current-limiting resistors and shunt fuses. Such systems are, however, still subject to very serious damage as a result of malfunctioning of parts, and it is the principal object of this invention to provide countermeasures against still remaining dangers, particularly dangers resulting from failure of the trigger means to trigger the thyristors of the thyristor networks when the thyristors should be triggered. There are several possibilities considering the failure of trigger means. The constituent thyristors of one, or the other, or of both thyristor networks may not be triggered at the time when they should be triggered.

Considering the case that no trigger pulses are supplied to the thyristors of the first thyristor network supposed to shunt the then engaged current-carrying contacts at the beginning of a tap-changing operation. As a result of such malfunctioning, an arc is drawn between the current-carrying contacts when they are caused to part. The current-carrying contacts are not designed to withstand arcing and are, therefore, damaged by the arc which is drawn between them. Since current-carrying contacts are not provided with arc-quenching means, the arc is not quenched but persists. A tap-changing operation involving arcing between parting current-carrying contacts results in a short-circuit when the current-carrying contacts which were initially separated are caused to engage one another. To be more specific, under such conditions the section of the transformer winding situated between two taps between which a change was intended is short-circuited by the malfunctioning of the thyristor trigger means, resulting in malfunctioning of the transfer switch proper. A situation of this kind is likely to cause severe damage to, or result in a destruction of, the entire faulted system.

SUMMARY OF THE INVENTION

This invention provides means for precluding damage to a tap-changing system of the kind under consideration in case of a failure of the thyristor triggering means and consequent current commutation failure. This is achieved by the provision of standby, or auxiliary, thyristor trigger means under the control of relay means which are energized by means of auxiliary switch means tied to, and jointly operative with, the parting current-carrying contacts of the transfer switch in case that the load current is not commutated from the current path including current-carrying contacts to a current path including a thyristor network.

The invention is thus based on the reasoning that it is necessary to determine initially whether a thyristor network is ready to commutate the load current from the current path including current-carrying contacts which are about to part, or which have already parted, and that the further operation of the system should be made dependent upon the outcome of such initial determination. In case that the aforementioned thyristor network is not ready for its commutating or current-carrying duty it should be triggered by stand-by, or auxiliary, trigger means. The triggering of the thyristors of both thyristor networks may result in short-circuiting of the section of the tapped transformer winding situated between the two taps involved in the particular tap-changing operation by way of the two thyristor networks. Such a short-circuit is, however, of relatively little consequence because of the provision of a current-limiting resistor and its shunt fuse in the current path of each thyristor network and because either or both fuses will blow and either or both resistors will limit the fault current. An arc which may have been kindled between parting current-carrying contacts will be quenched instantly when shunted by a triggered thyristor network.

DESCRIPTION OF PREFERRED EMBODIMENTS

Figure 1:
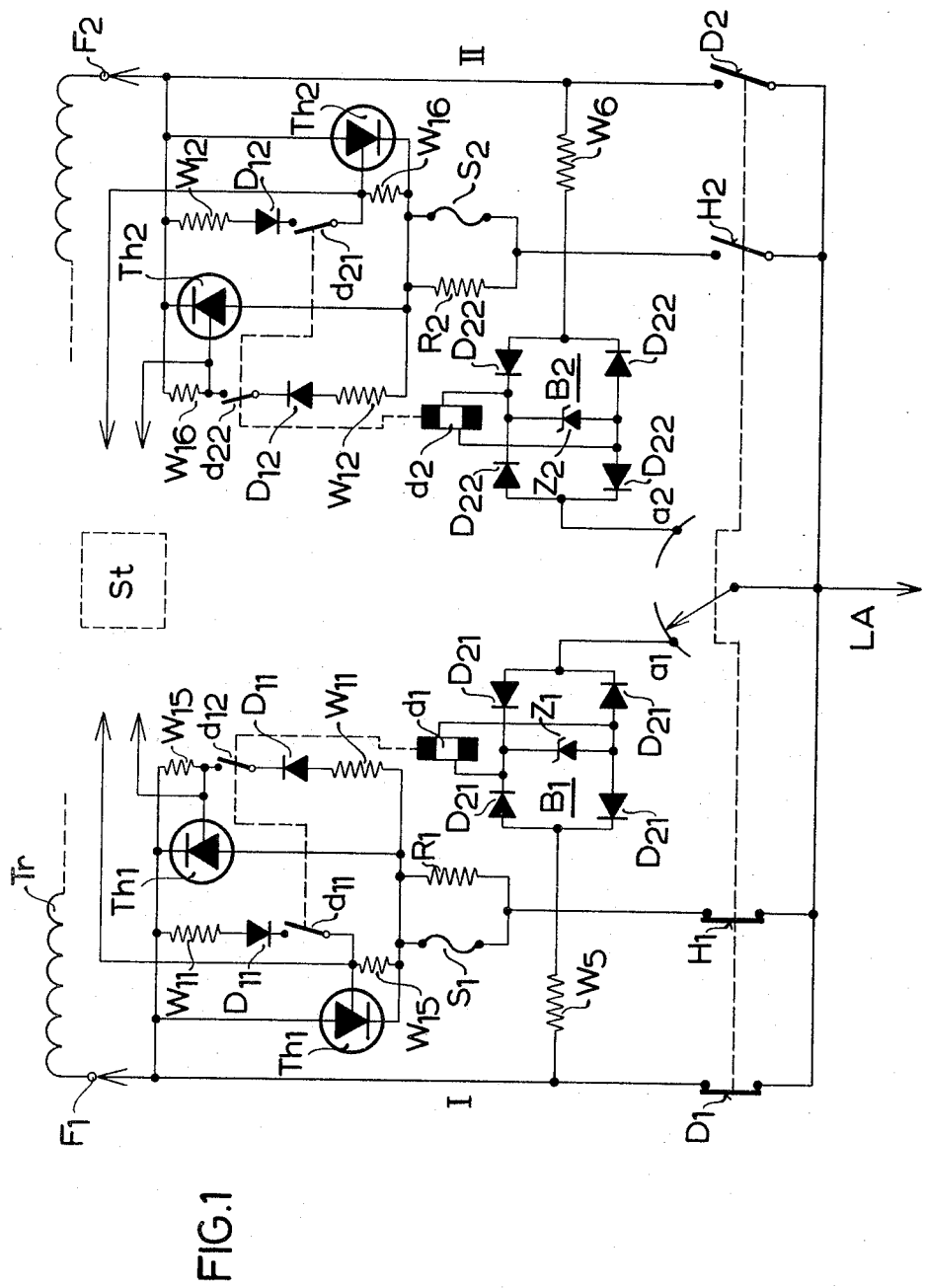
FIG.1 is a circuit diagram of a system embodying the present invention wherein the arc voltage of an arc kindled between a pair of parting current-carrying contacts is used as a signal for activating standby, or auxiliary, trigger means.

Referring now to the drawings, and more particularly to FIG.1 thereof, reference character Tr has been applied to indicate a tapped winding of a regulating transformer having taps $F_1$ and $F_2$. Reference character LA has been applied to indicate an outgoing line carrying the load current from tap $F_1$ by way of internal line I and the current-carrying contacts $D_1$ of a mechanical switching device to a given load (not shown). The aforementioned switching device includes the current-carrying contacts $D_1$, $D_2$ and the auxiliary contacts $H_1$, $H_2$. In the limit position of the switching device shown in FIG.1 contacts $D_1$,$H_1$ are closed, and contacts $H_2$,$D_2$ are open, and the current in line LA is solely derived from tap $F_1$. The switching device has two limit positions of which one is shown in FIG.1. In the other limit position of the switching device contacts $D_1$,$H_1$ are open and contacts $H_2$,$D_2$ closed. Then the entire load current flowing in outgoing line LA is derived from tap $F_2$ and its path includes internal line II and current-carrying contacts $D_2$. The term current-carrying contacts is applied to contacts $D_1$,$D_2$ to indicate that these contacts are designed to carry high currents continuously, but are not capable to interrupt currents, and to withstand arcing.

Reference character $Th_1$,$Th_1$ has been applied to indicate a first pair of inverse parallel connected thyristors, and reference character $Th_2$,$Th_2$ has been applied to indicate a second pair of inverse parallel connected thyristors. One terminal of the network including thyristors $Th_1$,$Th_1$ is conductively connected to tap $F_1$, and the other end of that network is connected by means of auxiliary contacts $H_1$ to outgoing load line LA. In a like fashion one terminal of the network including inverse parallel connected thyristors $Th_2$,$Th_2$ is conductively connected to tap $F_2$, and the other end of that network is connected by means of auxiliary contacts $H_2$ to outgoing load line LA. The aforementioned thyristor networks serve the purpose of selectively switching load line LA from tap $F_1$ to tap $F_2$, and vice versa. Contacts $H_1$,$H_2$ are in effect disconnects. As shown in FIG.1 disconnect $H_1$ is closed preparatory to a tap-changing operation from tap $F_1$ to tap $F_2$, and disconnect $H_2$ is open. In the stationary state when the entire load current is carried by contacts $D_1$ thyristors $Th_1$,$Th_1$ are not conductive, and disconnect $H_1$ may be closed, as mentioned above. Disconnect $H_1$ may, however, be opened if it is desired not to subject thyristor $Th_1$,$Th_1$ for long periods of time to a difference in voltage. If disconnect $H_1$ should be in the open position while the load current is derived from tap $F_1$, then disconnect $H_1$ must be closed preparatory to a tap-changing operation from tap $F_1$ to tap $F_2$ prior to separation of current-carrying contacts $D_1$.

Reference characters $R_1$,$R_2$ have been applied in FIG.1 to indicate a pair of current-limiting resistors each shunted by an electric fuse $S_1$ and $S_2$, respectively. Parts $R_1$,$S_1$ are connected in series with thyristors $Th_1$,$Th_1$ and parts $R_2$,$S_2$ are connected in series with thyristors $Th_2$,$Th_2$. During a tap-changing operation both disconnects $H_1$,$H_2$ must be closed. If both disconnects $H_1$,$H_2$ are closed and the networks including thyristors $Th_1$,$Th_1$ and $Th_2$,$Th_2$ are both conductive on account of a fault consisting in simultaneous triggering of the thyristors $Th_1$,$Th_1$;$Th_2$,$Th_2$ in both networks, this would result in short-circuiting the portion of the tapped transformer winding situated between taps $F_1$ and $F_2$. The ensuing short-circuit currents might reach a dangerous magnitude. This is avoided by the provision of current-limiting resistors $R_1$,$R_2$ and shunt fuses $S_1$,$S_2$. On occurrence of a fault of the aforementioned kind, resulting in a short-circuit of the portion of the transformer winding situated between taps $F_1$,$F_2$ electric fuses $S_1$,$S_2$ will blow, and resistors $R_1$,$R_2$ then limit the fault current to a permissible magnitude.

A tap-changing operation from tap $F_1$ to tap $F_2$ calls for closing of disconnect $H_2$, if it had not been closed previously, and also for closing of disconnect $H_2$. Then thyristors $Th_1$,$Th_1$ are triggered by the central trigger control unit St, and establish a current path parallel to the current path I including current-carrying contacts $D_1$. These contacts are then opened, and thyristors $Th_1$,$Th_1$ and disconnect $H_1$ carry the entire load current for a short period of time. Thereupon thyristors $Th_2$,$Th_2$ are triggered by the central control unit St and no more trigger pulses are supplied to thyristors $Th_1,Th_1$. As a result, a current path is established from tap $F_2$ to outgoing line LA which includes thyristors $Th_2,Th_2$ and closed disconnect $H_2$. At the next natural zero of the load current thyristors $Th_1,Th_1$ become nonconductive, causing cessation of the current flow through disconnect $H_1$. As a result of the above, the current in line LA is now derived from tap $F_2$, and not derived any longer from tap $F_1$. Thereupon current-carrying contacts $D_2$ are closed and disconnect $H_1$ is, or may be, opened. After closing of current-carrying contacts $D_2$ thyristors $Th_2,Th_2$ are rendered inoperative by the action of central trigger pulse control St.

The above steps are reversed when a tap-change from tap $F_2$ to tap $F_1$ is to be effected.

The circuitry and its mode of operation which have been described above is prior art. If in such a system the central trigger pulse control St fails, and such failure results in that no trigger pulses are applied to thyristors $Th_1$, $Th_1$ and $Th_2,Th_2$, respectively, the current initially flowing in line I and current-carrying contacts $D_1$ cannot be commutated to the parallel circuit including thyristors $Th_1,Th_1$ and closed disconnect $H_1$. Hence separation of current-carrying contacts $D_1$ results in that an arc is drawn therebetween which damages the contacts $D_1$ and cannot be quenched in the absence of any arc-quenching means. In systems of the kind under consideration contacts $D_1,H_1,H_2$ and $D_2$ are operated automatically in the required sequence. Therefore a tap-changing operation from tap $F_1$ to tap $F_2$ is automatically completed by closing of current-carrying contacts $D_2$ irrespective of whether or not an arc has been drawn by separation of the current-carrying contacts $D_1$. If thyristors $Th_1,Th_1$ were not triggered and an arc drawn between parting current-carrying contacts $D_1$, closing of current-carrying contacts $D_2$ results in that the transformer windings between taps $F_1$ and $F_2$ are short-circuited, the only resistance in the circuit then being that of the arc between the parted contacts $D_1$. Such a condition spells major disaster.

To avoid occurrence of situations as that described above, systems embodying this invention are provided with protective means which will now be described in detail.

Referring now again to FIG.1, reference character $d_1$ has been applied to indicate a protective relay the energizing winding of which is shunted across current-carrying contacts $D_1$. The energizing circuit of relay $d_1$ is controlled by an auxiliary switch $a_1$ which has common drive means with contacts $D_1,H_1,H_2$ and $D_2$. Auxiliary switch $a_1$ is initially closed and opens shortly after current-carrying contacts $D_1$ part. The energizing circuit of relay $d_1$ includes full wave rectifier bridge $B_1$ formed mainly by four diodes $D_{21}$ and Zener diode $Z_1$ for stabilizing the voltage of rectifier bridge $B_1$. Resistor $W_5$ is connected in series with rectifier bridge $B_1$ for protection of the diodes $D_{21}$ of the latter. It is thus apparent that relay $d_1$, if energized, is energized by the d-c output current of bridge $B_1$. The gate electrodes of thyristors $Th_1,Th_1$ are connected to the cathodes thereof by resistors $W_{15}$. The anodes of thyristors $Th_1,Th_1$ may be connected to the gates thereof by the intermediary of resistors $W_{11}$ and diodes $D_{11}$ connected in series with contacts $d_{11}$ and $d_{12}$, respectively, operated by relay $d_1$ as indicated by a dashed line. Due to the remanent magnetism of relay $d_1$, i.e., due to the magnetic induction which remains in its magnetic circuit after removal of an applied magnetomotive force, relay contacts $d_{11}$, $d_{12}$ remain closed upon having been closed, after auxiliary switch $a_1$ has opened.

Relay $d_2$ has an energizing circuit shunted across current-carrying contacts $D_2$. The energizing circuit of relay $d_2$ is controlled by auxiliary switch $a_2$. Switch $a_2$ closes incident a tap-changing operation from tap $F_1$ to tap $F_2$ following opening of switch $a_1$, and switch $a_2$ opens shortly after current-carrying contacts $D_2$ part when the latter are initially in engagement, and a tap-changing operation from tap $F_2$ to tap $F_1$ is effected.

As is apparent from the above in any tap-changing operation from tap $F_1$ to tap $F_2$ opening of auxiliary switch $a_1$ is followed by closing of auxiliary switch $a_2$, and in any tap-changing operation from tap $F_2$ to tap $F_1$ opening of auxiliary switch $a_2$ is followed by closing of auxiliary switch $a_1$.

FIG.1 shows two trigger pulse carrying lines terminating at the gate electrodes of thyristors $Th_1,Th_1$ and provided with arrows pointing to central trigger control unit St. These lines are intended to carry the pulses normally triggering thyristors $Th_1,Th_1$. FIG.1 further shows two trigger pulse carrying lines terminating at the gate electrodes of thyristirs $Th_2,Th_2$ and provided with arrows pointing to the central trigger control unit St. These lines are intended to carry the pulses normally triggering thyristors $Th_2$, $Th_2$.

The energizing circuit of relay $d_2$ includes rectifier bridge $B_2$ made up of four diodes $D_{22}$ and connected in series with resistor $W_6$. The cathodes and gates electrodes of thyristors $Th_2,Th_2$ are interconnected connected by resistors $W_{16}$. The anodes and gate electrodes of thyristors $Th_2,Th_2$ may be interconnected by means of resistors $W_{12}$ and diodes $D_{12}$ and these circuits are controlled by the contacts $d_{21}$, $d_{22}$ of relay $d_2$. The latter operates in the same fashion as relay $d_1$, i.e., it remains closed once closed after removal of an applied magnetomotive force.

Assuming that it is intended to switch load line LA from tap $F_1$ to tap $F_2$ and that the central trigger pulse control unit St fails to provide thyristors $Th_1,Th_1;Th_2,Th_2$ with the required trigger pulses. In that instance an arc is drawn between the parting current-carrying contacts $D_1$. At the time that arc is drawn auxiliary switch $a_1$ is still closed. Therefore bridge $B_1$ and relay $d_1$ are energized and contacts $d_{11}$, $d_{12}$ of relay $d_1$ closed. As described above contacts $d_{11}$, $d_{12}$ of relay $d_1$ remain closed even after relay $d_1$ is deenergized. As a result of closing of relay contacts $d_{11},d_{12}$ thyristors $Th_1,Th_1$ are triggered. Hence the current path I, $D_1$ is shunted by a current path including thyristors $Th_1,Th_1$. Following triggering of thyristors $Th_1,Th_1$ switch $a_1$ opens and shortly thereafter switch $a_2$ closes. At the time switch $a_2$ closes disconnect $H_2$ is likewise closed. Closing of switch $a_2$ results in energization of relay $d_2$, closing of its contacts $d_{21},d_{22}$ and forced triggering of thyristors $Th_2,Th_2$. Now the portion of the transformer winding between taps $F_1$ and $F_2$ is short-circuited by thyristors $Th_1,Th_1$ and $Th_2,Th_2$. The ensuing short-circuit current causes blowing of one or both fuses $S_1,S_2$ and resistors $R_1,R_2$ thereafter limit the current to safe values, thus effectively avoiding serious damage or destruction that results from like failures in prior art systems. In other words, the forced triggering of thyristors $Th_1,Th_1;Th_2,Th_2$ which has been described above shortens the arcing time when an arc is drawn between parting contacts $D_1$ incident to a switching operation from tap $F_1$ to tap $F_2$, or when an arc is drawn between parting contacts $D_2$ incident to a switching operation from tap $F_2$ to tap $F_1$. This results in a drastic reduction of arc energy so that no significant damage can occur to the system. The arcs which may be drawn between current-carrying contacts $D_1, D_2$ incident to parting thereof are instantly extinguished when these arcs are shunted by triggered thyristors $Th_1, Th_1$ and $Th_2, Th_2$, respectively.

Figure 2:
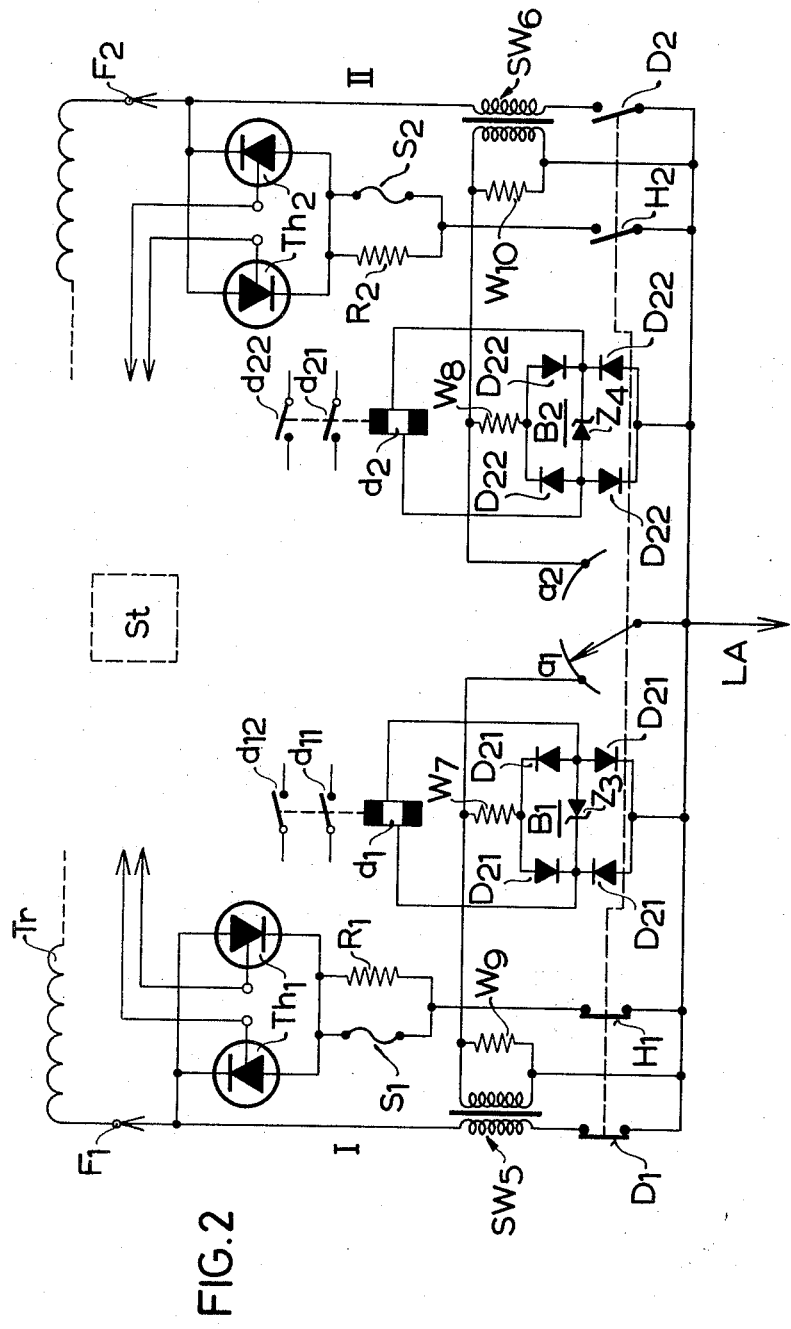
FIG.2 is a circuit diagram of another system embodying the present invention including a pair of special current transformers.

In FIG.2 the same reference numerals have been applied as in FIG.1 to indicate like parts. Therefore the circuitry of FIG.2 does not need to be described in detail inasmuch as it is identical to that of FIG.1 and inasmuch as it has been described above in detail. In FIG.2 some parts or circuits which have been deleted. This applies in particular in regard to the means for effecting forced triggering of inverse parallel connected thyristors $Th_1, Th_1$ and $Th_2, Th_2$. When relay $d_1$ of FIG.2 is energized the contacts $d_{11}, d_{12}$ are closed, and this causes forced triggering of thyristors $Th_1, Th_1$ by the means shown in FIG.1 and described in connection with this figure. In a like fashion, when relay $d_2$ of FIG.2 is energized contacts $d_{21}$ and $d_{22}$ thereof are closed and this causes forced triggering of inverse parallel connected thyristors $Th_2, Th_2$ by the means shown in FIG.1 and described in connection with this figure.

The rectifier bridges $B_1, B_2$ of FIG.2 are identical to those of FIG.1, but they are connected into the system in a different fashion which will be described below. In FIG.2 reference characters $SW_5$ and $SW_6$ have been applied to indicate two current transformers, or control transformers. The primary winding of transformer $SW_5$ is energized by the current flowing in line I, and the primary winding of transformer $SW_6$ is energized by the current flowing in line II. A resistive load $W_9$ is connected to the secondary winding of transformer $SW_5$ and a resistive load $W_{10}$ is connected to the secondary winding of transformer $SW_6$. One terminal of the secondary winding of transformer $SW_5$ is connected by the intermediary of diode protective resistor $W_7$ to one a-c input terminal of rectifier bridge $B_1$, and the other terminal of the secondary winding of transformer $SW_5$ is connected directly by leads to the other a-c input terminal of rectifier bridge $B_1$. The secondary winding of transformer $SW_6$ is connected to rectifier bridge $B_2$ in the same fashion as the secondary winding of transformer $SW_5$ is connected to rectifier bridge $B_1$, and the first mentioned circuit includes the diode protective resistor $W_8$.

If the normal trigger pulses from central control unit St to thyristors $Th_1, Th_1$ are absent while a tap-changing operation from tap $F_1$ to tap $F_2$ is attempted, an arc will be drawn between the parted current-carrying contacts $D_1$. As long as switch $a_1$ is closed, no voltage appears across the a-c terminals of rectifier bridge $B_1$. Such a voltage appears, however, if the current is not commutated from line I to thyristors $Th_1, Th_1$ incident to parting of contacts $D_1$. When a voltage is applied to the a-c terminals of rectifier bridge $B_1$, relay $d_1$ is energized by the d-c output of rectifier bridge $B_1$, resulting in closing of relay contacts $d_{11}, d_{12}$. This then causes forced triggering of thyristors $Th_1, Th_1$ by the forced triggering or standby triggering circuitry shown in FIG.1 and described in connection with this figure, including diodes $D_{11}$, resistors $W_{11}$, etc.

Since switch $a_1$ opens shortly following parting of the current-carrying contacts $D_1$, there is a small increment of time during which an arc may burn between the parted contacts $D_1$ before a shunt current path parallel to the current path I is established by operation of the standby triggering means for thyristors $Th_1, Th_1$.

The steps following triggering of thyristors $Th_1, Th_1$ by relay $d_1$ of FIG.2 are similar to those occurring in the circuitry of FIG.1.

Considering now a tap-changing operation from tap $F_2$ to tap $F_1$, in that instance auxiliary switch $a_2$ is initially closed, short-circuiting rectifier bridge $B_2$. Upon opening of auxiliary switch $a_2$ transformer $SW_6$ is energized in case of a current commutation fault, resulting in energization of the a-c circuit and the d-c circuit of rectifier bridge $B_2$, and consequently energization of relay $d_2$. This, in turn, activates the standby trigger means of thyristors $Th_2, Th_2$. Upon triggering of thyristors $Th_2, Th_2$ the arc across current-carrying contacts $D_2$ extinguishes since there is no longer any driving e.m.f. to maintain that arc. Not later than at the point of time of engagement of current-carrying contacts $D_1$ the section of the transformer winding between taps $F_2$ and $F_1$ is short-circuited. The short-circuit current path includes fuse $S_2$ which is caused to blow on account of the magnitude of the short-circuit current, resulting in subsequent limitation of the latter by resistor $R_2$.

Figure 3:
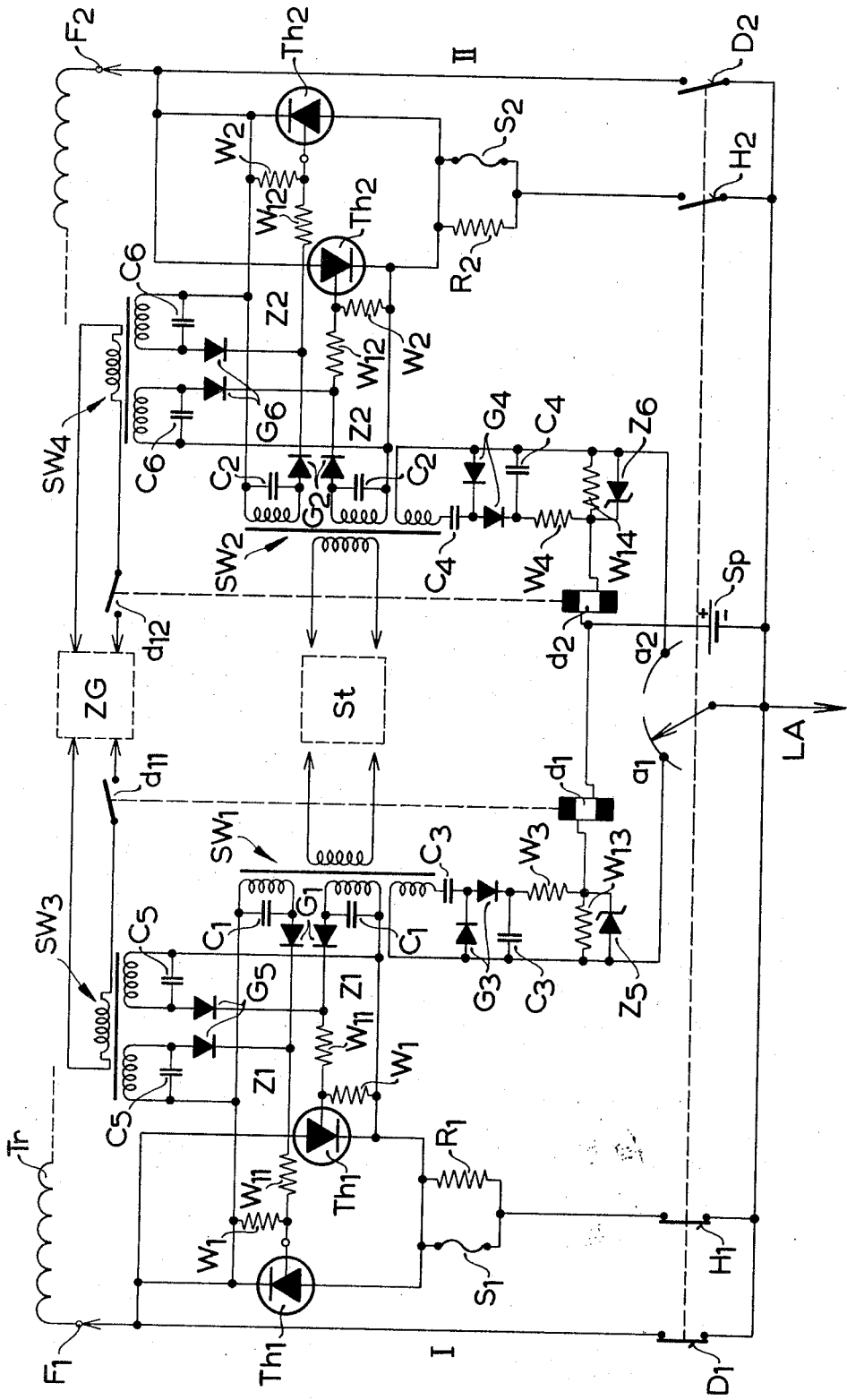
FIG.3 is a circuit diagram of still another system embodying the present invention predicated upon bucking of two voltages and including a primary trigger pulse generator and a standby, or auxiliary, trigger pulse generator.

Referring now to FIG.3, in that figure reference character St has been applied to indicate the central trigger pulse control unit for thyristors $Th_1, Th_1; Th_2, Th_2$ and reference numeral ZG has been applied to indicate an auxiliary or standby trigger pulse control unit for thyristors $Th_1, Th_1; Th_2, Th_2$ intended to become operative when, and in case that, trigger pulse control unit S fails. Trigger pulses for thyristors $Th_1, Th_1$ coming from trigger pulse control unit St are transmitted to thyristors $Th_1, Th_1$ by the intermediary of trigger pulse transformer SW1 and trigger pulses for thyristors $Th_1, Th_1$ coming from standby pulse control unit ZG are transmitted to thyristors $Th_1, Th_1$ by the intermediary of trigger pulse transformer SW3. Reference character SW2 has been applied to indicate a trigger pulse transformer for transmitting trigger pulses coming from unit St to thyristors $Th_2, Th_2$ and reference character SW4 has been applied to indicate a pulse transformer for transmitting trigger pulses from unit ZG to thyristors $Th_2, Th_2$.

Each trigger pulse transformer SW1, SW2 has one primary winding connected to unit $St_1$, two secondary windings each connected to one of thyristors $Th_1, Th_1$ and $Th_2, Th_2$, respectively, and a tertiary winding which will be considered below more in detail. Each of the trigger pulse transformers SW3, SW4 has a primary winding connected to unit ZG and two secondary windings each connected to one of thyristors $Th_1, Th_1$ and $Th_2, Th_2$, respectively. The trigger circuits $Z_1$ of thyristors $Th_1, Th_1$ further include diodes $G_1$, resistors $W_1$ and $W_{11}$ and capacitors $C_1$. The trigger circuits $Z_2$ of thyristors $Th_2, Th_2$ further include diodes $G_2$, resistors $W_2$ and $W_{12}$ and capacitors $C_2$. Resistors $W_{11}, W_{12}$ are current-limiting resistors, as in the circuitry shown in FIG.1. Capacitors $C_1$ and $C_2$ are shunted across the secondary windings of trigger pulse transformers $SW_1$ and $SW_2$, respectively. The presence of diodes $G_1, G_2$ in the gate circuits of thyristors $Th_1, Th_1; Th_2, Th_2$ precludes the occurrence of trigger pulses of wrong or negative polarity to said thyristors or, in other words, diodes $G_1, G_2$ rectify the output of transformers $SW_1, SW_2$. The auxiliary trigger circuits for thyristors $Th_1, Th_1; Th_2, Th_2$ which include the secondary windings of transformers SW3, SW4 further include diodes $G_5, G_6$ to rectify the output of these windings and capacitors $C_5, C_6$. It will be apparent from FIG. 3 that thyristors $Th_1, Th_1$ and $Th_2, Th_2$ can be triggered selectively either by unit St and transformers Sw1, SW2, or by unit ZG and transformers SW3, SW4.

The circuits of the tertiary windings of transformers SW1, SW2 include diodes $G_3, G_4$ to rectify the output of these tertiary windings and capacitors $C_3, C_4$ to increase the output voltage thereof, while Zener diodes $Z_5, Z_6$ operate as voltage stabilizers.

The circuit of the primary winding of transformer SW3 includes the normally open contacts $d_{11}$ of a relay $d_1$ and the circuit of the primary winding of transformer SW4 includes the normally open contacts $d_{12}$ of a relay $d_2$. Relays $d_1$ and $d_2$ may be energized by a d-c power supply Sp when switches $a_1$ and $a_2$, respectively, are closed. If trigger pulse control unit St is properly operating, the trigger pulses thereof induce in the tertiary winding of trigger pulse transformers SW1 and SW2 emf's which buck the emf of d-c power supply or battery Sp and thus preclude energization of relays $d_1$ and $d_2$, respectively, closing of contacts $d_{11}$ and $d_{12}$, respectively, and energization of trigger pulse standby transformers SW3 and SW4, respectively, by the standby trigger pulse control unit ZG.

A tap-changing operation from tap $F_1$ to tap $F_2$ is initiated by closing a disconnect contact $H_1$ preparatory to shunting current path I by thyristors $Th_1, Th_1$. Simultaneously with closing of disconnect contact $H_1$ contact $a_1$ is closed and the operation of trigger pulse generator — or control St is initiated. There are two different courses of action depending upon whether or not trigger pulse generator and control unit St triggers thyristors $Th_1, Th_2$ by the intermediary of trigger pulse transformer SW1. If units St and SW1 properly trigger thyristors $Th_1, Th_1$, the voltage of d-c power supply Sp is bucked, relay $d_1$ remains unenergized, its contacts $d_{11}$ remain open and units ZG and SW2 remain inoperative. In case that units St and SW1 fail to trigger thyristors $Th_1, Th_1$, no voltage is induced in the tertiary winding of trigger pulse transformer SW1. Hence power supply Sp energizes relay $d_1$, causing closing of the contacts $d_{11}$ thereof and triggering of thyristors $Th_1, Th_1$ by the intermediary of standby units ZG and SW3.

Switch $a_2$, power supply Sp, the tertiary winding of trigger pulse transformer SW2, relay $d_2$ and its contacts $d_{12}$ cooperate to connect standby trigger pulse unit ZG to standby trigger transformer SW4 in case that trigger pulse unit St and trigger pulse transformer SW2 should fail to timely trigger thyristors $Th_2, Th_2$ during a tap-changing operation from tap $F_1$ to tap $F_2$. During such an operation disconnect $H_2$ is closed preparatory to applying trigger pulses to thyristors $Th_2, Th_2$.

A tap-changing operation from tap $F_2$ to tap $F_1$ involves, in essence, the same steps in reverse as a tap-changing operation from tap $F_1$ to tap $F_2$.

The gist of the circuitry of FIG. 3 resides in the fact that the operation of the forced or standby triggering means does not depend upon the formation of arcs across parted current-carrying contacts $D_1$ and $D_2$, respectively, but upon a failure of trigger pulse control St to trigger thyristors $Th_1, Th_1$, or $Th_2, Th_2$, respectively. This makes it possible to avoid any arcing across parted contacts $D_1, D_2$ and consequent erosion thereof. All that is necessary is to delay parting of contacts $D_1, D_2$ until after the operativeness of units St, SW1 and SW2 has been tested and, in case of failure thereof, to operate standby units ZG, SW3 and SW4.

FIG. 1 shows conventional thyristor trigger circuits for thyristors $Th_1, Th_1; Th_2, Th_2$ for triggering these thyristors from the main a-c power supply in case of a failure of trigger unit St and FIG. 3 shows a standby trigger pulse generating and control unit ZG for triggering thyristors $Th_1, Th_1; Th_2, Th_2$ in case of a failure of the principal trigger pulse control unit St. The circuitry of FIG. 3 can readily be modified by omitting the standby unit ZG and substituting for the same some other standby thyristor triggering means as, for instance, the a-c power supply thyristor triggering means of FIG. 1. In such a combination of the circuitry of FIGS. 1 and 3 rectifier bridges $B_1$ and $B_2$ would be deleted, and the relays $d_1, d_2$ of FIG. 1 would be controlled by the circuitry of the tertiary winding of the trigger pulse transformers SW1 and SW2 of FIG. 3 and by the d-c power supply Sp of FIG. 3. The standby trigger pulse transformers SW3 and SW4 of FIG. 3 would be replaced by the thyristor trigger means of FIG. 1 and the contacts $d_{11}, d_{21}$ of relays $d_1, d_2$ would control the latter rather than the line between trigger pulse unit ZG and transformers SW3, SW4 of FIG. 3.

The structure or design of circuits St and ZG for generating and controlling the trigger pulses for thyristors $Th_1, Th_1; Th_2, Th_2$ do not form part of the present invention. Such units are well known prior art. Reference may be had to the patents listed below for details in regard to such units as units St and ZG and how such units may be controlled.

U.S. Pat. No. 3,437,913 to M. Matzl, Apr. 8, 1969 for TAPPED REGULATING TRANSFORMER HAVING THYRISTOR TRANSFER SWITCH MEANS;

U.S. Pat. No. 3,466,530 to M. Matzl, Sept. 9, 1969 for LOGIC-UNIT-CONTROLLED TAP-CHANGING TRANSFER SWITCH HAVING TRIGGER IMPULSE AMPLIFIER; and U.S. Pat. No. 3,502,961 to M. Matzl, Mar. 24, 1970 for TAP-CHANGING CIRCUITRY FOR REGULATING TRANSFORMERS.

I claim as my invention:

1. Tap-changing means for transformers having thyristors for effecting tap-changes including in combination a. tapped transformer winding means having a pair of taps;

b. a load-current-carrying line;

c. transfer switch means including two pairs of relatively movable current-carrying contacts for selectively connecting each of said pair of taps to said line, and two pairs relatively movable disconnect contacts;

d. two pairs of inverse parallel connected thyristors, each said pairs of thyristors being arranged to shunt one of said pair of current-carrying contacts in the closed position of one of said two pairs of disconnect contacts;

e. a pair of current-limiting resistors each shunted by an electric fuse, each of said pair of current-limiting resistors and the shunting fuse thereof being arranged in series with one of said two pairs of thyristors;

f. means for sequentially triggering said two pairs of thyristors for performing a tap-changing operation;

g. standby trigger means for each of said two pairs of thyristors;

h. a pair of relays each responsive to a failure of said means for sequentially triggering and each controlling said standby triggering means of one of said two pairs of thyristors; and i. a pair of auxiliary switch means jointly operated with one of said two pairs of current-carrying contacts and each controlling the energizing circuit of one of said pair of relays.

2. Tap-changing means as specified in claim 1 wherein each of said pair of auxiliary switch means controls a shunt circuit across one of said two pairs of current-carrying contacts including means for energizing one of said pair of relays in response to a difference of voltage across one of said two pairs of current-carrying contacts.

3. Tap-changing means as specified in claim 2 including a pair of rectifiers each having two a-c terminals adapted to be connected sequentially by said pair of auxiliary switch means across one of said two pairs of current-carrying contacts and each having d-c terminals connected to one of said pair of relays.

4. Tap-changing means as specified in claim 1 wherein each of said pair of relays is an electromagnetic relay having a magnetic circuit with such remanence that each of said pairs of relays remains closed upon energization and following deenergization thereof.

5. Tap-changing means as specified in claim 1 including a. a d-c power source under the control of said pair of auxiliary switch means tending to energize said pair of relays in the closed positions of said pair of auxiliary switch means;

b. a pair of trigger pulse transformers each for triggering one pair of said two pairs of thyristors, each of said pair of trigger pulse transformers having a tertiary winding; and c. two electric networks each energized by said tertiary winding of one of said pair of trigger pulse transformers and each bucking the voltage of said d-c power source when said tertiary winding of said pair of trigger pulse transformers is energized and thereby precluding energization of said pair of relays.

6. Tap-changing means for transformers having thyristors for effecting tap changes including in combination a. tapped transformer winding means having at least one pair of taps;

b. a load-current-carrying line;

c. transfer switch means including two pairs of relatively movable current-carrying contacts for selectively connecting each of said pair of taps to said line and two pairs of relatively movable disconnect contacts;

d. two pairs of inverse parallel connected thyristors, each of said pair of thyristors being arranged to shunt one of said pair of current-carrying contacts in the closed position of one of said two pairs of disconnect contacts;

e. principal triggering means for sequentially triggering said two pairs of thyristors when effecting a tap-changing operation;

f. standby triggering means for each of said two pairs of thyristors;

g. a pair of relays each responsive to a failure of said principal triggering means and each controlling said standby triggering means of one pair of said two pairs of thyristors;

h. a pair of auxiliary switch means jointly operated with one of said two pairs of current-carrying contacts each controlling the energizing circuit of one of said pair of relays; and i. means for precluding the flow of excessive currents upon triggering of said pairs of thyristors by said stand-by triggering means, said excessive current precluding means including a pair of current-limiting resistors each arranged in series with one said two pairs of thyristors and each shunted by an electric fuse so that in case of triggering of said pairs of thyristors by said standby triggering means said fuse shunting each of said pairs of resistors tends to blow and the current flow subsequent to blowing is limited by at least one of said pair of current-limiting resistors.

7. Tap-changing means as specified in claim 6 including a d-c power supply tending to energize said pair of relays in the closed positions of said pair of auxiliary switch means, and means responsive to the state of said principal triggering means precluding energization of said pair of relays when said principal triggering means generate trigger pulses.

8. Tap-changing means as specified in claim 7 including a pair of trigger pulse transformers each having a primary winding energized by said principal triggering means, a pair of secondary windings supplying trigger pulses to one of said pairs of thyristors, and a tertiary winding generating a voltage bucking the voltage of said d-c power supply.

9. Tap-changing means as specified in claim 6 wherein said standby triggering means include a standby trigger pulse generator, a pair of standby trigger pulse transformers each having a primary winding energized by said standby trigger pulse generator and a pair of secondary windings supplying standby trigger pulses to one of said pairs of thyristors, and wherein the primary circuit of each of said pair of standby trigger pulse transformers is under the control of one of said pair of relays.

10. Tap-changing means as specified in claim 6 including means tending to energize one said pair of relays in the closed position of one of said pair of auxiliary switch means, and means under the control of said principal triggering means precluding energization of said one of said pair of relays in case that said principal triggering means supply trigger pulses to one of said pairs of thyristors.

* * * * *